US 3,005,795
Patented Oct. 24, 1961

3,005,795
THERMOPLASTIC RESINS CONTAINING FINELY DIVIDED, FIBROUS POLYTETRAFLUOROETHYLENE
Warren Froemming Busse and George Henry Bowers III, Wilmington, Del., assignors to E. I. du Pont de Nemours and Company, Wilmington, Del., a corporation of Delaware
No Drawing. Filed Dec. 10, 1957, Ser. No. 701,703
7 Claims. (Cl. 260—45.5)

This invention is concerned with novel synthetic polymeric resin mixtures particularly useful as improved compositions for extrusion and thermoforming. More particularly, this invention is concerned with normally rigid thermoplastic polymers which contain small amounts of fine, fibrous particles of polytetrafluoroethylene resin dispersed throughout. These resin mixtures, when molten, are characterized by increased melt viscosity and melt elasticity, and are valuable for use in forming operations such as wirecoating extrusion and thermoforming.

As is well known, there are many different high-molecular weight organic polymers made up of long chains of carbon atoms, sometimes interrupted by connecting links such as amide, ester, and ether linkages, which are useful as thermoplastic resins for fabrication into articles by such means as melt extrusion and thermoforming. These organic polymers are relatively rigid solids at normal temperatures but form more or less viscous melts at elevated temperatures so that they can be shaped into useful articles while molten and then solidified simply by cooling.

However, it often is difficult to fabricate these polymers by extrusion because the temperature range for optimum melt viscosity is critical and quite narrow. At too low a temperature these polymers do not flow freely; at a temperature only a few degrees higher, their viscosity may have dropped so far that the melts are too fluid to extrude wire-coatings, tubes, films, etc. easily.

In thermoforming processes, a sheet of polymer is first softened, generally by some form of radiant heat treatment, and then transferred to a mold where it is shaped by pressing or vacuum-drawing over or into a die. It is often very difficult to control the heating of such sheets so that they are softened sufficiently to be readily shaped and yet will not sag and flow excessively prior to the shaping step.

For such processes, polymers are desired which have a high melt viscosity over a wide temperature range when measured at low shearing stresses, yet which have a low viscosity at high shearing stresses. Polymers which have higher melt elasticity tend to meet these requirements. It is frequently impossible to polymerize directly from monomers an organic polymer of a particular chemical class having optimum melt viscosity and melt elasticity for extrusion and thermoforming.

Therefore, it is an object of this invention to provide normally rigid, thermoplastic, organic high polymers having improved melt properties for fabrication into shaped articles by such methods as extrusion and thermoforming. It is another object of this invention to provide normally rigid, thermoplastic, organic high polymers characterized by unusually high melt viscosity over a broad range of temperatures above the melting points of the polymers. Still another object of this invention is to provide the aforesaid thermoplastic, organic high polymers with melt elasticity greater than that normally exhibited by such polymers. Other objects and advantages of this invention will become apparent from the following description of this invention and from the examples.

It has now been discovered that the objects of this invention can be achieved by providing a synthetic thermoplastic resin comprising, as base resin, a normally-rigid, high molecular weight organic polymer and, as modifier, well dispersed therein, from 0.05% to 20% by weight of a polytetrafluoroethylene resin in the form of finely-divided microfibrous and submicrofibrous particles having diameters ranging from about 100 A. up to about 2 microns. If the process of dispersing the polytetrafluoroethylene resin in the base polymer by mastication or milling is interrupted before dispersion is complete, the larger fibrous particles are readily observable under the microscope along with undispersed agglomerates. Such partially-dispersed mixtures do not attain the maximum properties obtainable with products of this invention. When the mixing is carried to the point of optimum dispersion, a major portion of the polytetrafluoroethylene particles become so attenuated as to have diameters below the resolving power of an optical microscope.

The aforesaid normally-rigid, high molecular weight organic polymers with which this invention is concerned are made up of a class of large molecules characterized by long chains of carbon atoms which may also contain polar groups as connecting links in the chains. Such materials are useful as thermoplastic resins since they can be shaped while molten and set by cooling. Such polymeric materials have the general formula:

where $n$ is an integer, greater than about 50. A is a hydrocarbon diradical having a formula selected from

and

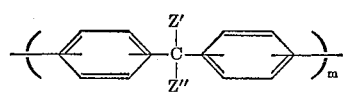

where $m$ is an integer between 1 and 20 and $Z'$ and $Z''$ are selected from hydrogen and alkyl; and B is a connecting link radical selected from radicals which can be represented by the following formulae:

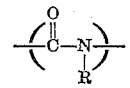

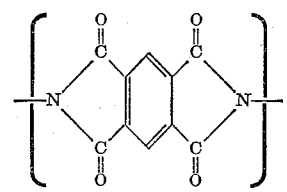

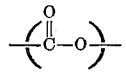

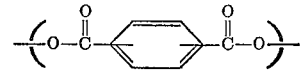

and

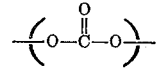

where X is selected from the group consisting of hydrogen, alkyl, aryl, and halogen, Y is selected from hydrogen, halogen, nitrile, carboxylate ester, alkoxy and acetal, and R is selected from hydrogen, alkyl, aryl, alkaryl, and alkoxymethyl. The normally rigid thermoplastic resins included within this definition consist of hydrocarbon polymers such as polyethylene, other polyolefins and copolymers of ethylene with 1-olefins, polystyrene, polyvinyl halides, polyvinylidene halides, polyacrylates, including inter alia polymethyl-methacrylate, linear polycarbonamides made by the intermolecular polymerization of linear diamines containing from 6 to 10 carbon atoms with linear dicarboxylic acids containing from 2 to 10 carbon atoms and their amide-forming derivatives and the superpolyamides made by the intramolecular polymerization of omega-amino acids containing from 4 to 12 carbon atoms and their amide-forming derivatives, such as polyhexamethyleneadipamide, polyhexamethylenesebacamide, and polycaprolactam, polycarbonimides, polyethers, polycarbonates, and polyoxyalkalenes, particularly high molecular weight, thermally-stable polyoxymethylene.

The polytetrafluoroethylene resin employed in the compositions of this invention as modifier for the aforesaid organic polymers must be in the form of a finely-divided powder or fluff as obtained from the polymerization reaction.

When a mass of this finely-divided untreated polytetrafluoroethylene resin of average particle size 0.1 to 0.2 micron, such as that illustrated in FIGURES 1 and 2 of the article "Teflon" Tetrafluoroethylene Resin Dispersion by J. F. Lontz and W. B. Happoldt, Jr., in Ind. and Eng. Chem., vol. 44, p. 1800, 1952, is sheared by rubbing in the hands, the particles tend to stick together and form a coherent mass. If this mass is drawn out and examined with a microscope at 50–100×, it shows fibers of various sizes. Examination with an electron microscope shows that these fibers are bundles of smaller fibers, many of which consist of strings of the primary particles held together by very fine fibrils having diameters from one-fourth to one-tenth or less of the diameter of the particles. If the particles are first sintered by heating for some time above 330° C., or if they are given $10^6$ rep. or more of 2 mev. electron radiation, the tendency of the particles to stick together and form a coherent paste when the mass is rubbed is very much reduced or lost, probably because these particles no longer tend to form the ultrafine fibrils. Polytetrafluoroethylene which has been given treatments which reduce the tendency of the particles to adhere and draw out into ultrafine fibrils when they are rubbed together with mechanical shearing, is not suitable for use in the practice of this invention.

Untreated polytetrafluoroethylene fluff, during dispersion into an organic polymer of the class defined hereinabove, at temperatures where the base resin is highly viscous, undergoes attenuation so that the individual particles become filiform or funicular in shape. Microscopic examination of a cross-section of a product of this invention reveals the presence of polytetrafluoroethylene particles having a generally fibrous structure, although, as is the case when the polytetrafluoroethylene particles alone are rubbed together, many of the finest fibers are below the range of visibility at 100× magnification. Some of the micro-fibrous particles observed in cross-sections of products of this invention are in the form of spiral, spring-like coiled fibers. The presence of large numbers of such coiled fibers is thought to be in part responsible for the high degree of melt elasticity exhibited by these products. If desired, the polytetrafluoroethylene particles can be given a micro-fibrous structure before incorporation in the base resin by subjecting them to high rates of shear when dispersed in suitable medium such as oil, or in a process such as water-cutting, whereby microfibers having diameters of less than 2 microns are obtained. In this way micro-fibrous polytetrafluoroethylene can be introduced into highly-fluid solutions and melts of the base resin; in the cases where solutions are employed, after dispersing the micro-fibrous polytetrafluoroethylene, the base resin can be precipitated; with the polytetrafluoroethylene dispersed throughout, by removal of the solvent or by coagulation.

After a composition has been prepared as described above, it may be sheeted out on a mill or calendar. This sheet may then be cut up to provide resin granules of a size suitable for feeding to a forming device such as an extruder or injector-molding apparatus.

This invention is further described by the following examples which are intended as particular illustration of the subject invention and not as limitation thereon.

EXAMPLE 1

A branched-chain polyethylene resin having a density when annealed of 0.920 to 0.925, a melt index of about 2 and a melting point of 110–115° C. was employed in this demonstration of the subject invention.

Melt index as employed herein is a measure of melt viscosity. It is measured by placing the resin in a small cylinder having a diameter of 0.377 inch and a length of about 6 inches. A piston 0.373 inch diameter is fitted into the top of the cylinder and pressed down with a load of 2160 g. The cylinder is heated and maintained at 190° C. When the resin has melted and reached the temperature of the cylinder, it is allowed to extrude through a small capillary having a diameter of 82.5 mils and a length of 315 mils. The weight of resin extruded in 10 minutes is taken as the melt index, so that a high melt viscosity results in a low melt index. The increase in diameter of the extrudate above that of the orifice is a measure of the elasticity of the melt.

Samples of this polyethylene were mixed with 0.1% and 1.0%, by weight, respectively, of a polytetrafluoroethylene resin in the form of a fine powder, designated herein as PTFE–A. The milling was done on a small rubber mill at 160° C. for 10 minutes. The polytetrafluoroethylene resin A was a fine powder characterized as having a total surface area of 9 to 12 square meters per gram as determined by $N_2$ adsorption, the primary particles having a diameter of about 0.2 micron with aggregates of these particles forming clusters about 500 microns in diameter.

Microscopic examination (at 50–100×) of the samples after milling showed many fine fibers of polytetrafluoroethylene. At magnification of 400× there sometimes appears to be a series of discreet round particles with extremely fine filaments connecting these particles in each filament. The exact appearance of this dispersion under the microscope depends, of course, on the concentration and amount of milling or shearing the samples have received. With the larger amounts of polytetrafluoroethylene there usually are more large aggregates in addition to more of the fine fibers. Longer mixing times are required to break up the larger particles of polytetrafluoroethylenes into the extremely fine, ultramicroscopic fibrils.

The compositions of polyethylene containing 0.1% and 1.0% polytetrafluoroethylene resin A, as well as controls of polyethylene alone, were compression-molded at 130° C., using care to duplicate loading so that the flow pattern would be the same in all cases, to give 35-mil sheets which were cut into strips 3 inches long by 0.5 inch wide.

The large and surprising effect of the small amounts of added polytetrafluoroethylene resin on the melt elasticity of the polyethylene was demonstrated by a simple test. Strips were cut from the samples with the long dimension in the direction of greatest flow. These were allowed to relax by hanging them for 30 minutes in an air oven at 130° C., which is above the crystalline melting point of the polyethylene. High melt elasticity was indicated by a large decrease in length and width and a corresponding increase in thickness. The results of this experiment are listed in Table I. Where the samples did not shrink uniformly, the maximum size in each dimension is given.

Table I
RELAXATION OF POLYETHYLENE STRIPS MOLDED AT 130° C. AND REHEATED TO 130° C.

|  | Original dimensions | Relaxed dimensions | | |
|---|---|---|---|---|
|  |  | Control—polyethylene | Polyethylene plus 0.1% PTFE-A | Polyethylene plus 1% PTFE-A |
| Length (in.) | 3.00 | 2.56 | 1 | 0.9 |
| Width (in.) | 0.50 | 0.27 | 0.24 | 0.25 |
| Thickness (in.) | 0.035 | 0.075 | 0.32 | 0.40 |

These results show that as little as 0.1% of this PTFE-A resin produced a remarkable increase in the elasticity of the melt, as evidenced by the stresses frozen in on cooling the molding, and the decrease in length from 3 inches to about 1 inch, and the increase in thickness from 0.035 inch to about 0.32 inch on reheating.

EXAMPLE 2

An exceptionally stiff, linear polyethylene resin having a density (20°/4°) when annealed between 0.95 and 0.97 g./cc., a melting point above 127° C., and a melt index of 4.25, as defined hereinabove, was employed for this experiment. The term "linear polyethylene" refers to the substantially linear structure of the carbon chain in this species of polyethylene which is disclosed in U.S. application Serial No. 240,044, filed on August 2, 1951, by A. W. Larcher and D. C. Pease, now U.S. Patent 2,816,-883, issued December 17, 1957. Such polyethylene is characterized by exceptional stiffness or rigidity, which is a consequence of the unusually high crystallinity or low amorphous content of this material, and by having branches along the main carbon chain at a frequency of less than one branch in 200 carbon atoms. This linear polyethylene was mixed with 1% by weight of the polytetrafluoroethylene resin-A described in Example 1; in this case the milling was carried out at 160° C. for 10 minutes whereby a uniform dispersion of the polytetrafluoroethylene fibrillated particles in the polyethylene resin was obtained.

This product, together with a linear polyethylene control, was evaluated by extrusion through a melt-indexer device at 190° C. as described above. The results are given in Table II.

Table II
EXTRUSION THROUGH A MELT INDEXER OF LINEAR POLYETHYLENE CONTAINING 1% PTFE-A

|  | Melt index | Diameter of extrudate (inches) |
|---|---|---|
| Control—Linear polyethylene | 4.25 | 0.105 |
| Linear polyethylene plus 1.0% PTFE-A | 1.41 | >0.250 |

The marked decrease in melt index produced by the addition of 1% polytetrafluoroethylene is a measure of the considerable increase in the melt viscosity of this sample as compared with the control. The extrudate diameter of the control is only about 20% greater than that of the orifice (0.083) while the sample containing 1% PTFE-A has a diameter over 200% greater than that of the orifice, showing the large increase in the melt elasticity of the product resulting from the addition of the polytetrafluoroethylene.

EXAMPLE 3

For these experiments, the branched-chain polyethylene described hereinabove in Example 1 was employed. A somewhat different type of polytetrafluoroethylene resin, designated herein as PTFE-resin B, was employed. Resin B may be characterized as a granular, fluffy, highly anisotropic powder containing a substantial proportion of fibrous particles and having diameters in the range of 2.8–4.0 microns and an apparent bulk density of 150–200 grams/liter. The particle diameter range referred to above is the calculated specific surface particle diameter as determined by an air-permeability method.

The branched-chain polyethylene was mixed with 0.25%, 1.0% and 5.0% of the PTFE-B resin by milling for 10 minutes at 160° C. whereby uniform dispersions of fibrillated polytetrafluoroethylene resin particles in the polyethylene were obtained, as in the previous examples.

These products, together with a polyethylene control, were evaluated by extrusion through a melt indexer device, at 190° C. as previously described in Example 1. The results of these evaluations are listed in Table III.

Table III
EXTRUSION THROUGH A MELT INDEXER OF POLYETHYLENE CONTAINING DISPERSED PTFE-B RESIN

| Percent PTFE-B | Melt index | Diameter of extrudate (inches) |
|---|---|---|
| 0.0 | 1.99 | 0.135 |
| 0.25 | 1.70 | >0.200 |
| 1.0 | 1.01 | >0.200 |
| 5.0 | 0.24 | >0.200 |

The marked and progressive decrease in the melt index of the above mixtures with increasing content of polytetrafluoroethylene resin is a measure of the increasing melt viscosity of these samples while the large increase in the diameters of the extrudates is a measure of a large increase in the melt elasticity of these products.

EXAMPLE 4

Portions of a normally solid, high molecular weight, tough, thermally stable polyoxymethylene diacetate resin, having an inherent viscosity of at least 0.8 measured on a 0.5% solution of the polymer in p-chlorophenol at 60° C. in the presence of 2% by weight of alpha-pinene as stabilizer and a reaction rate constant for thermal degradation at 222° C. of less than 1% by weight of polymer per minute, as described and claimed in copending application Serial No. 681,188 filed August 30, 1957, by S. Dal Nogare and J. O. Punderson, were milled with 1% and with 5% by weight of the polytetrafluoroethylene resin B described in the previous example. The milling was done on 2-inch rolls at 190° C. for 10 minutes, and the products sheeted out, cut up, and tested by the determination of flow numbers. The flow number is determined in a manner analogous to melt index as described in Example 1 except that a load of 5060 g. is put on the piston, the temperature is 200° C., and an orifice 0.0143 inch diameter by 0.158 inch long is used for the extrusion; the weight of polymer extruded in 10 minutes is taken as the flow number. The results of these experiments are given in Table IV.

Table IV
EFFECT OF POLYTETRAFLUOROETHYLENE RESIN ON THE FLOW NUMBER AND MELT ELASTICITY OF POLYOXYMETHYLENE RESIN

| Amount of PTFE-B percent by weight | Flow number | Extrudate diameter (inches) |
|---|---|---|
| 0 | 4.3 | 0.043 |
| 1 | 3.0 | 0.14 |
| 5 | 1.2 | >0.15 |

Thus a surprising increase in melt viscosity and a very large increase in melt elasticity, as indicated by extrudate diameter, is obtained by the addition of polytetrafluoroethylene to polyoxymethylene in such a manner as to give the polytetrafluoroethylene particles a micro-fibrous shape. Other polyoxymethylenes may be used equally well such as those described and claimed in U.S. Patent 2,768,994 issued on October 30, 1956, to R. N. MacDonald, and the polyoxymethylenes described in copending applications S.N. 443,703 filed July 15, 1954, by S. H. Jenkins and J. O. Punderson, now abandoned, and S.N. 682,325 filed September 6, 1957, by N. Brown, W. P. Langsdorf, and C. E. Schweitzer.

EXAMPLE 5

The procedure followed in this example was similar to that of Example 4, but a polymethylmethacrylate resin was employed as base resin. It was milled with PTFE-A and with PTFE-B resins previously described. The "Flow Number" in this case was measured at 230° C., using a load of 3760 g. on the piston, with an orifice 0.083" diameter and 0.315 inch long. As seen by the results listed in Table V, the finely-divided PTFE-B resin produced remarkable decrease in the flow number of polymethylmethacrylate with an accompanying increase in melt elasticity.

*Table V*

EFFECT OF POLYTETRAFLUOROETHYLENE ON THE FLOW NUMBER AND MELT ELASTICITY OF POLYMETHYLMETHACRYLATE

| Amount of PTFE-B percent by weight | Flow number | Extrudate diameter (inches) |
|---|---|---|
| 0 | 4.15 | 0.100 |
| 1 | 2.09 | >0.350 |
| 5 | No flow | |
| PTFE-A | | |
| 0 | 3.88 | 0.110 |
| 0.1 | 2.89 | 0.33±.04 |
| 0.3 | 2.55 | 0.435 |
| 1 | 1.22 | >0.365 |

The PTFE-A resin was slightly more effective than the PTFE-B resin in producing an increase in melt viscosity and melt elasticity.

EXAMPLE 6

A linear superpolyamide resin, polyhexamethyleneadipamide, was milled with 2% by weight of the PTFE-A resin described in Example 1. When milled without the PTFE-A additive the nylon was stringy and tended to draw out into fibers under the nip of the mill rolls, but with the added PTFE-A resin, the product was coherent and rubbery in the melt and did not form strings, showing the melt elasticity was increased.

Because of the high temperature required to melt the polyhexamethylene adipamide, there is some degradation if the melt is not blanketed with nitrogen or other inert gas during the milling. A Banbury mixer, blanked with $N_2$ or $CO_2$, is suitable for dispersing the polytetrafluoroethylene. These compositions are useful for extrusion as a coating on wire and as film or thin sheeting because of the large increase observed in both melt elasticity and melt viscosity.

EXAMPLE 7

The effects of various amounts of a polytetrafluoroethylene resin on the melt viscosity of a clear polystyrene resin were determined by milling the polystyrene for 10 minutes at 140° C. on a 2-inch mill with the PTFE-A resin of Example 1. Products were sheeted out, cut up, and the melt index determined as in Example 1 with the results shown in Table VI.

*Table VI*

EFFECTS OF POLYTETRAFLUOROETHYLENE RESIN ON THE MELT INDEX AND MELT ELASTICITY OF POLYSTYRENE

| PTFE-A added percent by weight | Melt index | Extrudate diameter (inches) |
|---|---|---|
| 0 | 0.19 | 0.100 |
| 0.1 | 0.13 | 0.150 |
| 1.0 | 0.11 | 0.200 |
| 5.0 | 0.04 | |

Here again the presence of polytetrafluoroethylene gave the sample a high melt elasticity, due to the well-dispersed microfibers.

EXAMPLE 8

One particularly valuable use of the products of this invention is in vacuum thermoforming. In order to demonstrate this use, a sample of a substantially linear polyethylene, as described in Example 2, but having a melt index of 0.8, was mixed in 10-pound batches on 16-inch diameter mill rolls with 0, 0.1, 0.3 and 1.0% of the PTFE-A resin described previously. Sheets 12x12x0.030 inches then were pressed from these products and tested in a commercial vacuum forming unit using a 3⅜ inch diameter by 4-inch deep cup mold. In this process, the plastic sheet was first heated in air by radiant heaters before being transferred to the mold.

Since the amount of sag which the heated sheet undergoes is often a limiting factor in the use of thermoplastics in this process, the effect of the polytetrafluoroethylene in limiting this sag was tested by clamping 2-inch wide strips side-by-side and parallel between two pairs of bars 9 inches apart and subjecting the assembly to the amount of radiant heat required in the process. The heat source was removed, the samples cooled and solidified, and the distance each strip had sagged from the horizontal was measured with the results shown in Table VII.

*Table VII*

EFFECT OF POLYTETRAFLUOROETHYLENE IN REDUCING THE SAG OF POLYETHYLENE SHEETS IN THERMOFORMING PROCESS

Amount of PTFE-A,
| Percent by weight: | Sag, inches |
|---|---|
| 0 | 2.62 |
| 0.1 | 2.44 |
| 0.3 | 1.25 |
| 1.0 | <0 |

The reduction in sag is a result of the increased melt elasticity of the products of this invention. The force exerted by this melt elasticity was graphically shown by the fact that the sample containing 1% polytetrafluoroethylene shrank and partially pulled out of the clamps so that, in fact, its sag was less than zero.

The polyethylene sheets containing 0.1 to 0.3% polytetrafluoroethylene resin processed best in this operation since they did not wrinkle and buckle near the tops, as did the control sheets containing no PTFE-A resin, and they had smoother surfaces than the sample containing more PTFE.

It is essential that the polytetrafluoroethylene in the products of this invention be well dispersed throughout the normally-rigid, thermoplastic resin as finely-divided, attenuated, fibrous particles. This can be achieved by milling the polytetrafluoroethylene into the viscous melt of the resin for periods just long enough so that the initial particles are broken up. If the milling is continued for as much as ten to twenty times the amount necessary to disperse the fibers, excessive mechanical working will tend to break the fibrils into short lengths or crumple them up into balls, thus reducing their effect on the melt elasticity. Thus it is critical in preparing these products that milling time be kept within an optimum range sufficient to disperse the particles into fibers, but not long enough to break up or agglomerate the fine fibers.

EXAMPLE 9

A polyethylene having a melt index of 4.9 and giving a melt extrudate diameter of 0.094 inch was milled for increasing lengths of time with 0.1% by weight of polytetrafluoroethylene resin A, and the melt indices and extrudate diameters were determined with the results shown in Table VIII.

*Table VIII*

| Milling time (minutes) | Melt index | Extrudate diameter (inches) |
|---|---|---|
| 2 | 4.4 | >0.200 |
| 6 | 4.5 | >0.200 |
| 15 | 4.6 | 0.175 |
| 30 | 4.3 | 0.125 |
| 45 | 4.0 | 0.117 |
| 60 | 3.5 | 0.125 |

With milling times of 15 minutes or more, the melt elasticity is reduced and the fibrous character of the polytetrafluoroethylene is likewise reduced.

EXAMPLE 10

The effect of the initial particle size of the polytetrafluoroethylene is shown in the following example:

A linear polyethylene of density 0.95 and melt index 1.5 was milled on a 4″ mil at 160° with 0.2% and 1% of polytetrafluoroethylene resins prepared in various ways to give different initial particle sizes. The melt index and density of the extrudate of each sample were determined with the results shown in Table IX.

*Table IX*

| Polytetrafluoroethylene added | | 0.2% concentration | | 1.0% concentration | |
|---|---|---|---|---|---|
| Kind | Particle diameter (mm.) | Melt index | Extrudate diameter (inches) | Melt index | Extrudate diameter (inches) |
| A | Control | 1.40 | .105 | 1.40 | .105 |
| A | 0.0002 | 1.33 | .145 | 0.6 | >.300 |
| B | 0.005 | 1.32 | .120 | 1.0 | .290 |
| C | 0.6 | 1.35 | .111 | 1.1 | .260 |
| D | ¹0.0002 | 1.39 | .101 | ---- | ---------- |

¹Irradiated.

The shapes of the particles in polytetrafluoroethylene B and C are illustrated in FIGURES 11 and 9, respectively, of the article "Designing Polymers for Use as Plastics," by F. C. McGrew, in Modern Plastics, page 155, November 1957. It is seen that the amount of swelling or melt elasticity decreases with increasing particle size in the series A, B, C.

Particle size is not the only factor that determines the effectiveness of the polytetrafluoroethylene. An equally important factor is the ability of the particles to break down to fine fibrils during the milling. This is shown by comparing samples A and D. These have the same particle size, but sample D has been irradiated with about 1.6 megareps. of radiation from a 2 mev. Van de Graaff generator. This treatment is known to degrade the polytetrafluoroethylene and thus reduce its tendency to form fibrils under the shearing action during the milling.

EXAMPLE 11

Sintering the "Teflon" by heating at above its crystalline melting point also reduces its tendency to form fibrils on shearing, and this likewise reduces its effectiveness in increasing the elasticity of the polymer.

A sample of polytetrafluoroethylene A was compacted by extrusion, then sintered by heating to 380° for about one minute. The product was then ground at low temperature to particles from 0.02 to 0.5 mm. diameter. On milling one percent of this product into a linear polyethylene, the particles did not disperse and break down into fibrils, and they did not change either the melt index or melt elasticity of the polyethylene.

The original polytetrafluoroethylene resin A, when present in a concentration of 1%, causes a profound effect on the melt elasticity, as it increases the diameter of the melt index extrudate from about .120 inch to about 0.300 inch.

EXAMPLE 12

The specificity of polytetrafluoroethylene in producing the products of this invention when milled into a rigid thermoplastic resin was shown by the fact that other fibrous particles such as asbestos and various fine fibrous glass particles were without much effect on the melt elasticity and melt index of a linear polyethylene resin with which they were milled. Likewise other fluorocarbon polymers, such as a copolymer of tetrafluoroethylene and hexafluoropropylene, were ineffective. In some cases, on addition of other materials, the melt elasticity of the base resin was actually reduced as shown by the following data in Table X.

*Table X*

OTHER ADDITIVES IN RIGID, LINEAR POLYETHYLENE

| Additive | Amount percent by weight | Melt index | Extrudate diameter (inches) |
|---|---|---|---|
| Control | 0 | 4.63 | 0.100 |
| Copolymer of tetrafluoroethylene and hexafluoropropene | 0.2 | 4.63 | 0.102 |
|  | 1.0 | 4.66 | 0.101 |
|  | 5.0 | 4.17 | 0.100 |
| Asbestos | 1.0 | 4.6 | 0.092 |
|  | 5.0 | 4.1 | 0.085 |
|  | 10.0 | 3.4 | 0.087 |
| Fibrous glass—A | 1.0 | 4.0 | 0.097 |
|  | 5.0 | 3.8 | 0.081 |
| Fibrous glass—B | 1.0 | 4.6 | 0.090 |
|  | 5.0 | 4.1 | 0.077 |

The solid state properties of the rigid thermoplastic resins employed in the products of this invention are not greatly modified at normal room temperatures by the addition of small amounts of polytetrafluoroethylene resin, since the large cohesive forces of the base resin at these temperatures effectively mask any effects of small concentrations of polytetrafluoroethylene. However, some anisotropy may be observed in compositions containing more than 1% polytetrafluoroethylene dispersed as microfibers. At temperatures near and slightly above the normal softening temperatures of the rigid thermoplastics where their intermolecular cohesive forces are greatly reduced, the dispersed microfibrous particles of polytetrafluoroethylene do act as reinforcing agents, imparting a certain degree of tensile strength and stiffness, roughly proportional to the percentage of polytetrafluoroethylene added, where the base resin alone would be fluid. This is illustrated in the following example.

EXAMPLE 13

Samples of a branched polyethylene of density 0.923 and melt index 2.0 were milled on a 4″ mill at 160° C. for 10 minutes while adding 0, 5, 10, 15, and 20% polytetrafluoroethylene resin A. The samples were then pressed into films and the tensile properties of the films at 120° C., above the crystalline melting point of the polyethylene, were determined with an Instron tester. The results are shown in Table XI:

Table XI
TENSILE PROPERTIES AT 120° C. OF POLYETHYLENE CONTAINING POLYTETRAFLUOROETHYLENE RESIN A

| Percent polytetrafluoro-ethylene A | Tensile strength (p.s.i.) | Ultimate elongation (percent) |
|---|---|---|
| 0 | (1) | (1) |
| 5 | 62.7 | 220 |
| 10 | 125 | 260 |
| 15 | 155 | 210 |
| 20 | 105 | 190 |

[1] Too tacky to test.

The control, without polytetrafluoroethylene, was too soft and tacky to test at 120° C., where most of the crystals are melted. Those samples with polytetrafluoroethylene resin had significant tensile strengths at 120° C., indicating that the fine fibrils of polytetrafluoroethylene had reinforced the melt, giving it strength as well as elasticity. The finding that compositions containing 20% polytetrafluoroethylene resin had lower strength than those containing 15% polytetrafluoroethylene may indicate an optimum concentration of around 15%.

As would be obvious to one skilled in the use of plastics, the products of this invention may be compounded with small amounts of ultraviolet absorbing materials or thermal and oxidative inhibitors which improve their resistance to weathering and to use at elevated temperatures. Finely-dispersed carbon blacks may be added to improve their outdoor durability. Decorative effects may be achieved by the addition of pigments and dyes. The high melt viscosity and melt elasticity of these products make them valuable, as pointed out hereinabove, for extrusion of sheets, wire coverings, and the like, and sheets of these compositions are particularly useful for thermoforming process.

There is claimed:

1. As a composition of matter, a synthetic, thermoplastic resin mixture comprising, as base resin, a normally rigid, high molecular weight organic polymer which has the general formula $(A-B)_n$ wherein $n$ is an integer, greater than about 50, A is a hydrocarbon diradical, having a formula selected from the group consisting of

and

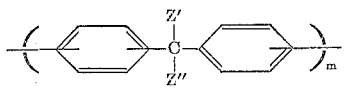

where $m$ is an integer between 1 and 20 and Z′ and Z″ are selected from the group consisting of hydrogen and alkyl; and B is a connecting link radical selected from the group consisting of

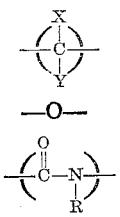

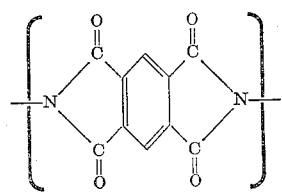

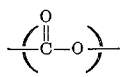

and

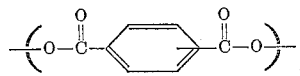

where X is selected from the group consisting of hydrogen, alkyl, aryl, and halogen, Y is selected from the group consisting of hydrogen, halogen, nitrile, carboxylate ester, hydroxyl, alkoxy and acetal, and R is selected from the group consisting of hydrogen, alkyl, aryl, alkaryl, and alkoxy-methyl, and, as modifier, well-dispersed therein from 0.05% to 20% by weight of polytetrafluoroethylene in the form of a mixture of finely-divided microfibrous and sub-microfibrous particles having diameters ranging from about 100 A. up to about 2 microns.

2. As a composition of matter, a synthetic, thermoplastic resin mixture comprising, as base resin, a normally rigid, high molecular weight 1-olefin polymer and, as a modifier, uniformly dispersed therein from 0.05% to 20% by weight of polytetrafluoroethylene in the form of a mixture of finely-divided microfibrous and submicrofibrous particles having diameters ranging from about 100 A. to about 2 microns.

3. A composition of claim 2 wherein the 1-olefin polymer is polyethylene.

4. As a composition of matter, a synthetic, thermoplastic resin mixture comprising, as base resin, polystyrene and, as a modifier, uniformly-dispersed therein from .05% to 20% by weight of polytetrafluoroethylene in the form of a mixture of finely-divided, microfibrous and sub-microfibrous particles having diameters ranging from about 100 A. to about 2 microns.

5. As a composition of matter, a synthetic, thermoplastic resin mixture comprising, as base resin, a high molecular weight, thermally-stable polyoxymethylene having an inherent viscosity in p-chlorophenol (0.5% solution) of at least 0.8 and a reaction rate constant for thermal degradation at 222° C. of less than 1% by weight of polymer per minute, and, as modifier, uniformly-dispersed therein from 0.05% to 20% by weight of polytetrafluoroethylene in the form of a mixture of finely-divided microfibrous and sub-microfibrous particles having diameters ranging from about 100 A. to about 2 microns.

6. As a composition of matter, a synthetic, thermoplastic resin mixture comprising, as base resin, polymethylmethacrylate and, as modifier, uniformly dispersed therein from 0.05% to 20% by weight of polytetrafluoroethylene in the form of a mixture of finely-divided microfibrous and sub-microfibrous particles having diameters ranging from about 100 A. to about 2 microns.

7. As a composition of matter, a synthetic, thermoplastic resin mixture comprising, as base resin, a nylon resin consisting of fiber-forming synthetic linear polymeric carbonamide which contains recurring carbonamide groups as an integral part of the main polymer chain separated by at least two carbon atoms, and, as modifier, uniformly-dispersed therein from 0.05% to 20% by weight of polytetrafluoroethylene in the form of a mixture of finely-divided microfibrous and sub-microfibrous particles having diameters ranging from about 100 A. to about 2 microns.

(References on following page)

References Cited in the file of this patent

UNITED STATES PATENTS

| | | |
|---|---|---|
| 2,400,091 | Alfthan | May 14, 1946 |
| 2,532,691 | Berry | Dec. 5, 1950 |
| 2,681,324 | Hochberg | June 15, 1954 |
| 2,698,966 | Stott et al. | Jan. 11, 1955 |
| 2,754,223 | Caroselli | July 10, 1956 |
| 2,945,827 | Henning | July 19, 1960 |
| 2,951,047 | Lantes | Aug. 30, 1960 |

FOREIGN PATENTS

| | | |
|---|---|---|
| 486,628 | Canada | Sept. 16, 1952 |